United States Patent
Yen et al.

(10) Patent No.: US 7,106,235 B1
(45) Date of Patent: Sep. 12, 2006

(54) ACTIVE HYBRID CIRCUIT FOR A FULL DUPLEX CHANNEL

(75) Inventors: Ming-Chou Yen, Hsinchu (TW); Hsin-Chieh Lin, Hsinchu (TW); Kun-Ying Tsai, Hsinchu (TW); Jui-Tai Ko, Hsinchu (TW); Chun-Wang Wei, Hsinchu (TW)

(73) Assignee: Semiconductor Co., Ltd., Hsinchu (TW)

( * ) Notice: Subject to any disclaimer, the term of this patent is extended or adjusted under 35 U.S.C. 154(b) by 0 days.

(21) Appl. No.: 11/139,475

(22) Filed: May 31, 2005

(51) Int. Cl.
*H03M 1/66* (2006.01)

(52) U.S. Cl. .................. 341/144; 375/219; 375/295; 375/346; 455/296

(58) Field of Classification Search .............. 375/219, 375/295, 316, 346; 341/144
See application file for complete search history.

(56) References Cited

U.S. PATENT DOCUMENTS

| | | | |
|---|---|---|---|
| 6,373,908 B1 * | 4/2002 | Chan | 375/346 |
| 6,665,347 B1 | 12/2003 | van Bavel et al. | |
| 6,744,831 B1 | 6/2004 | Chan | |
| 6,775,529 B1 | 8/2004 | Roo | |
| 6,792,105 B1 | 9/2004 | Moyer | |

* cited by examiner

*Primary Examiner*—Rexford Barnie
*Assistant Examiner*—Khai Nguyen
(74) *Attorney, Agent, or Firm*—Rosenberg, Klein & Lee

(57) ABSTRACT

An active hybrid circuit for a full duplex channel generates a duplicated voltage at the current output stage to reduce the energy of the transmitter transmitted to the receiver. The active hybrid circuit cancels the energy of the transmitter transmitted to the receiver when it is operated in a full duplex channel with high-speed transmission. The active hybrid circuit for full a duplex channel comprises a transmit digital-to-analog converter for generating an analog transmit signal, a receive analog-to-digital converter for receiving an analog receive signal, a duplicated voltage digital-to-analog converter for generating a corresponding duplicated voltage according to the analog transmit signal of the transmit digital-to-analog converter, and a plurality of signal combiners for subtracting the duplicated voltage from the analog transmit signal to cancel the influence of analog transmit signal to the analog receive signal.

12 Claims, 6 Drawing Sheets

ACTIVE HYBRID CIRCUIT FOR A FULL DUPLEX CHANNEL

BACKGROUND OF THE INVENTION

1. Field of the Invention

The present invention relates to an active hybrid circuit for use in a full duplex channel. In particular, this invention provides an active hybrid circuit to generate a duplicated voltage of a current output stage for reducing the energy of the transmitter echoing to the receiver when the hybrid circuit is operated in a full duplex channel.

2. Description of the Related Art

Due to the demand for information communication, such as the transmission of data, sound, and video, the data transmission rate has improved continually as the hardware and communication protocol have progressed to achieve high-speed and real time transmission. Information transmission and business transactions over the Internet have increased as personal computers, workstations and servers become more and more popular. For Ethernet, the transmission rate has also improved from the early original 10 Mbps of the IEEE 802.3 10BASE-T standard, 100 Mbps of the IEEE 802.3u 100BASE-T standard, to 1 Gbps of the IEEE 802.3ab 1000BASE-T standard. 1 Gbps Ethernet is also called a Gigabit Ethernet.

However, when a Gigabit Ethernet is operated over a full duplex channel, meaning a high-speed bi-directional transmission, the energy of the transmitter is coupled to the receiver of the transceiver. The signal at the receiver will be disturbed by the signal at the transmitter. If the signals are not processed appropriately, the signals at the receiver will be incorrect or the range of the transmitted signal will be shorter.

To solve the problems identified above, many hybrid circuits have been developed. Hybrid circuits can be classified into voltage output stages and current output stages. The voltage output stage includes transformer hybrids and resistive hybrids. The current output stage includes, for example, transformer hybrids, resistive hybrids, duplicated current hybrids and duplicated voltage generator hybrids.

U.S. Pat. No. 6,775,529, "Active resistive summer for a transformer hybrid", discloses an active resistive summer, as shown in FIG. 1. The active resistive summer comprises an operational amplifier 11, a feedback resistor $R_{F1}$ and a plurality of resistors $R_{11}$, $R_{12}$, $R_{13}$. A composite signal and a replica signal are inputted into the active resistive summer and a receiving signal is produced. The replica signal is subtracted from the composite signal to obtain the receiving signal. This method needs to generate a duplicated current which passes through a high-precision resistor to obtain a duplicated voltage. Therefore, a trimming operation is necessary when the IC is packaged in order to obtain the high-precision resistor in the IC.

U.S. Pat. No. 6,744,831, titled as "Adaptive electronic transmission signal cancellation apparatus for full duplex communication", discloses an adaptive electronic transmission signal cancellation apparatus. This apparatus generates a first duplicated transmission signal to cancel the signal in the receiver that comes from the transmitter. At the same time, by utilizing the characteristic of the transmitter and the first duplicated transmission signal, a second duplicated transmission signal is generated to cancel the excess current of the signal at the transmitter. In this apparatus, a trimming operation is also necessary when the IC is packaged.

U.S. Pat. No. 6,665,347, "Output driver for high speed Ethernet transceiver", discloses an output driver combination, as shown in FIG. 2. The output driver combination comprises a current driver 20, a voltage driver 21, a transformer 22 and a plurality of resistors $R_{23}$, $R_{24}$, $R_{25}$, $R_{26}$, $R_{27}$, $R_{28}$, $R_{29}$. This driver can operate in two operation modes, including high speed and low speed. However, the output driver cannot be used at high-speed and a low supply voltage.

U.S. Pat. No. 6,792,105, "Current-mode differential active hybrid circuit", discloses a current-mode differential active hybrid circuit. The active hybrid circuit comprises a first output H-bridge (including a first transistor and a first output resistor), a drive circuit, a second output H-bridge and a second output resistor. The drawback of this device is its high pin count in the IC. Because the characteristics of the transformer are not perfect, the above method cannot completely eliminate the disturbance at the receiver caused by the transmitted signal.

SUMMARY OF THE INVENTION

The main object of the present invention is to provide an active hybrid circuit for a full duplex channel. This invention generates a duplicated voltage at a current output stage to reduce the energy of the transmitted signal at the receiver when it is operating in a full duplex channel. The energy of the transmitter transmitted to the receiver affects the error rate of the data transmission and the transmitter range. The active hybrid circuit of the present invention solves the above-identified problems.

Another aspect of the present invention is to provide an active hybrid circuit for a full duplex channel. The active hybrid circuit comprises an adjustable circuit. Because transformers are not perfect, transformers often boost high frequency signals. The active hybrid circuit with an adjustable circuit overcomes the difference between transformers and reduces the overshoot of high frequency signals.

In order to achieve the above objects, the present invention provides an active hybrid circuit for use in a full duplex channel. The active hybrid circuit comprises a transmit digital-to-analog converter (DAC) having a positive output port and a negative output port for generating an analog transmit signal, a receive analog-to-digital converter (ADC) having a positive input port and a negative input port for receiving an analog receive signal, the positive input port and the negative input port of the receive analog-to-digital converter being electrically connected to the corresponding positive output port and the negative output port of the transmit digital-to-analog converter, a duplicated voltage digital-to-analog converter having a positive output port and a negative output port for generating a corresponding duplicated voltage according to the analog transmit signal of the transmit digital-to-analog converter, the positive output port and the negative output port of the duplicated voltage digital-to-analog converter being electrically connected to the corresponding positive output port and negative output port of the transmit digital-to-analog converter, and a plurality of signal combiners electrically connected to the corresponding positive output/input port and negative output/input port of the transmit digital-to-analog converter, the receive analog-to-digital converter and the duplicated voltage digital-to-analog converter for subtracting the duplicated voltage from the analog transmit signal to eliminate the influence of the analog transmit signal on the analog receive signal.

The present invention also provides a method for processing signals by an active hybrid circuit for a full duplex channel. The method comprises: generating a transmit signal by a transmitter having a current output driver; generating a duplicated voltage that is generated according to the corresponding output drive current of the transmit signal through a load resistor of the transmission line; combining the duplicated voltage and the transmit signal to cancel the echo signal of the receiver that comes from the transmit signal of the transmitter; amplifying the receive signal without the echo signal to increase the resolution; and converting the receive signal via an analog-to-digital converter.

To understand the invention further, reference is made to the following detailed description illustrating the embodiments and examples of the invention. The description is only for illustrating the invention and is not intended limit its scope.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 1:
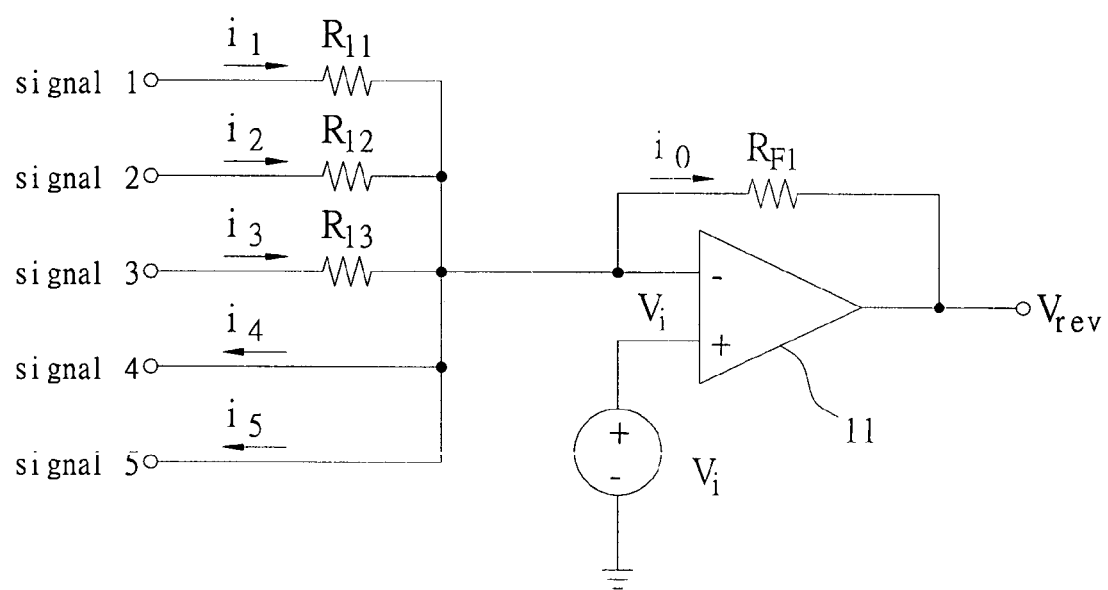
FIG. 1 is a schematic diagram of the active resistive summer for a transformer hybrid of the prior art.
Figure 2:
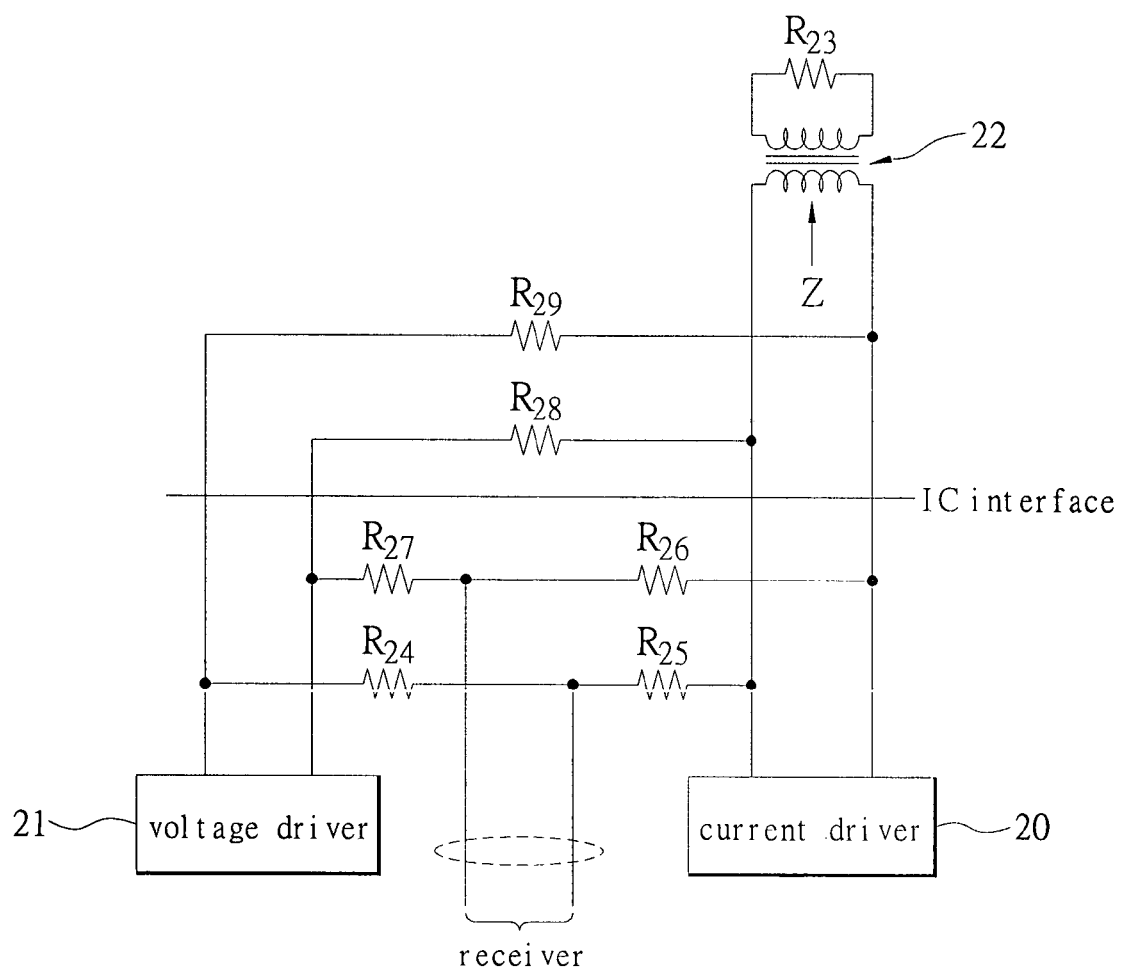
FIG. 2 is a schematic diagram of the output driver for a high speed Ethernet transceiver of the prior art.
Figure 3:
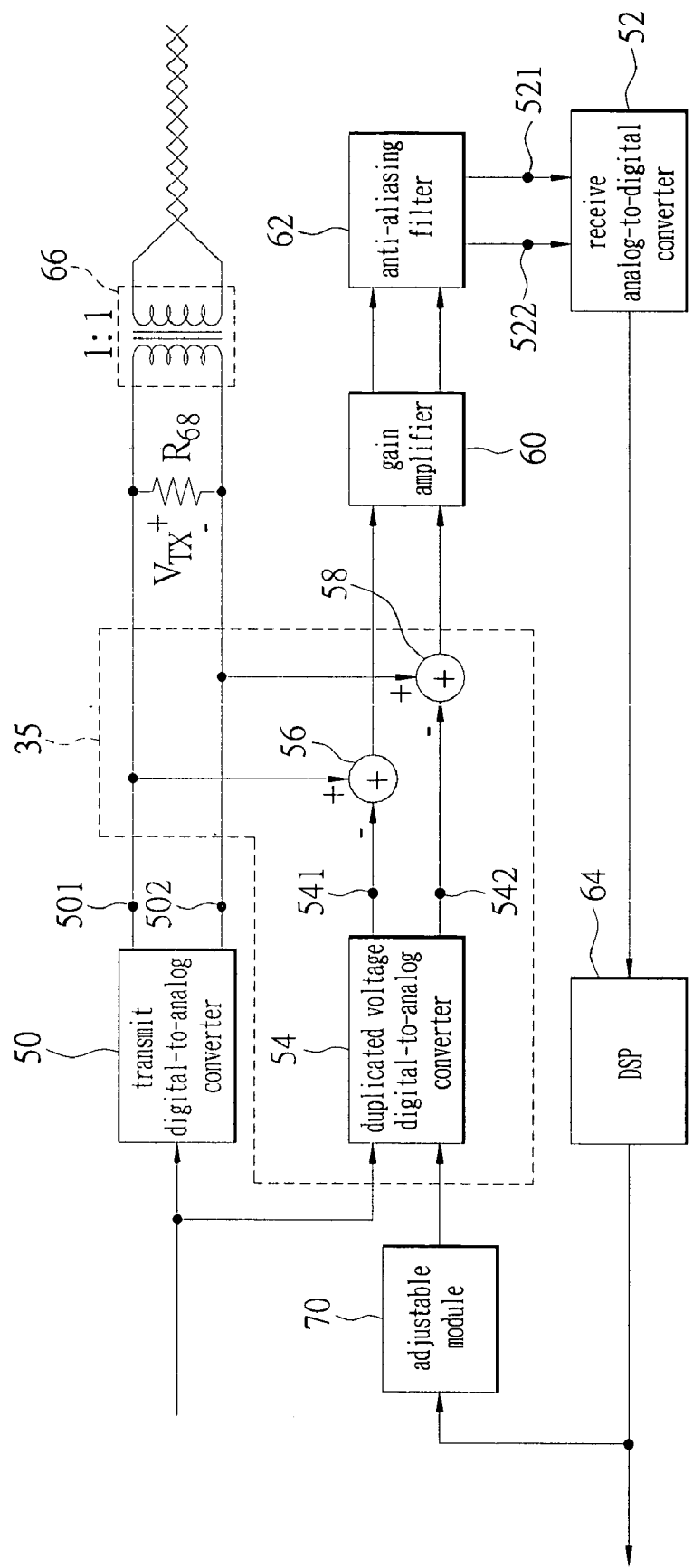
FIG. 3 is a schematic diagram of one embodiment of the active hybrid circuit for a full duplex channel of the present invention.

Referring to FIG. 3, there is shown a schematic diagram of one embodiment of an active hybrid circuit for a full duplex channel of the present invention. The active hybrid circuit comprises a transmit digital-to-analog converter (DAC) 50 having a positive output port 501 and a negative output port 502 for generating an analog transmit signal and a receive analog-to-digital converter (ADC) 52 having a positive input port 521 and a negative input port 522 for receiving an analog receive signal. The positive input port 521 and the negative input port 522 of the receive analog-to-digital converter 52 is electrically connected to the corresponding positive output port 501 and negative output port 502 of the transmit digital-to-analog converter 50. A duplicated voltage digital-to-analog converter 54 having a positive output port 541 and a negative output port 542 is electrically connected to the positive output port 501 and negative output port 502 of the transmit digital-to-analog converter 50 for generating a corresponding duplicated voltage according to the analog transmit signal of the transmit digital-to-analog converter 50. A plurality of signal combiners 56 and 58 are electrically connected to the corresponding positive output/input port and negative output/input port of the transmit digital-to-analog converter 50, the receive analog-to-digital converter 52 and the duplicated voltage digital-to-analog converter 54 to subtract the duplicated voltage from the analog transmit signal to eliminate the influence of the analog transmit signal on the analog receive signal.

The duplicated voltage that corresponds to the analog transmit signal is generated by the duplicated voltage digital-to-analog converter 54. The duplicated voltage is obtained by calculating a voltage from current (I) that passes through a resistor. $R_{68}$ that is parallel to a transformer 66, i.e. V=I*R. Then, the duplicated voltage digital-to-analog converter 54 outputs the duplicated voltage to cancel the energy of the transmitter that is transmitted to the receiver. In order to increase the resolution, a gain amplifier 60 is used for amplifying the receive signal. The gain amplifier 60 is electrically connected to the plurality of signal combiners 56 and 58. An anti-aliasing filter 62 is electrically connected to the gain amplifier 60 for canceling aliased signals in the receive signal. A digital signal processor (DSP) that is electrically connected to the output port of the receive analog-to-digital converter 52 executes a digital process to the output signal of the receive analog-to-digital converter 52.

In order to overcome the difference between the components of the circuit, such as the variations of the transformer, the active hybrid circuit for a full duplex channel of the present invention further comprises an adjustable module 70. The adjustable module 70 fine-tunes the duplicated voltage to eliminate the overshoot of the signal that is caused by variations in the transformer. The adjusting quantity can be calculated by the DSP 64.

Figure 4A:
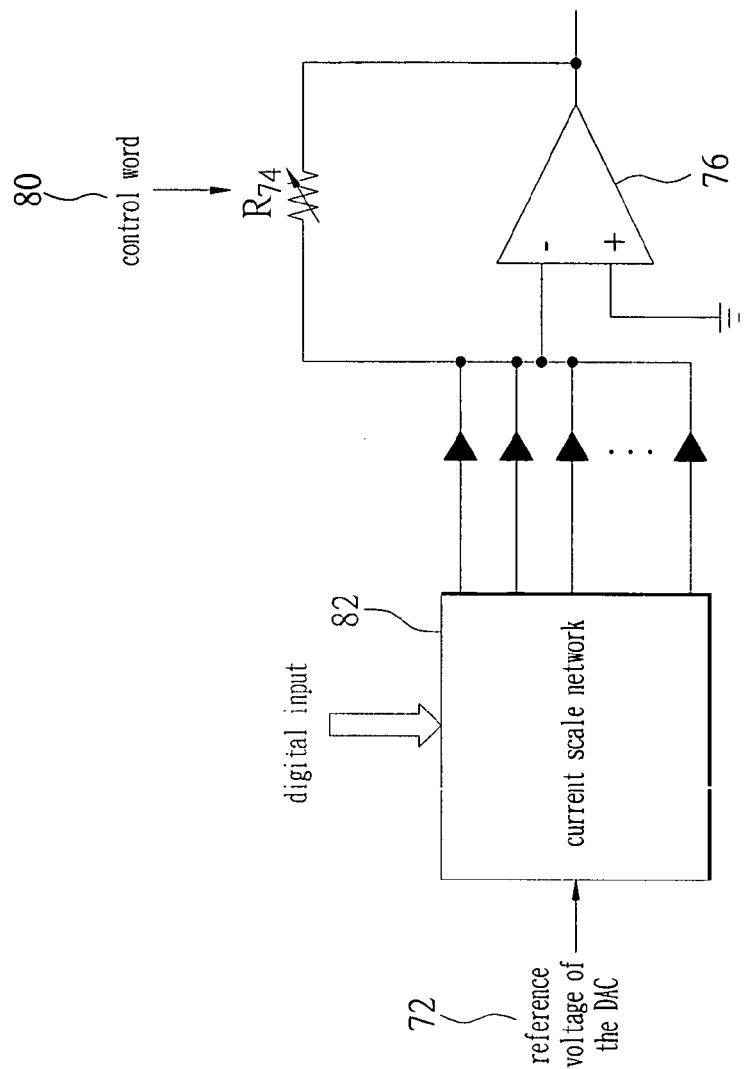
FIG. 4A is a schematic diagram of one embodiment of the duplicated voltage digital-to-analog converter and the adjustable module of the present invention.
Figure 4B:
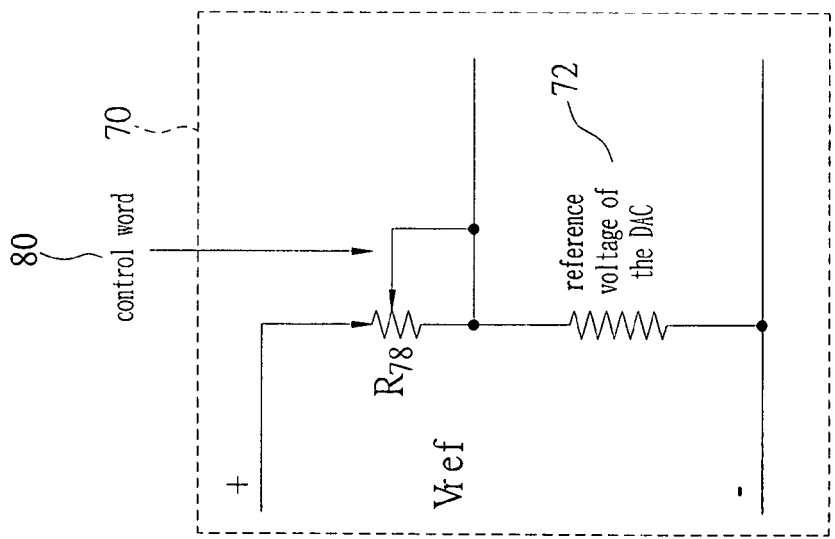
FIG. 4B is a schematic diagram of another embodiment of the adjustable module of the present invention.

Referring to FIG. 4A, there is shown a schematic diagram of one embodiment of a duplicated voltage digital-to-analog converter and an adjustable module of the present invention. The duplicated voltage digital-to-analog converter 54 is composed of a current scale network 82, an operational amplifier 76 and a resistor $R_{74}$. When the resistor $R_{74}$ is a digital adjustable resistor, it is the adjustable module 70 of the present invention. The DSP 64 outputs a control word 80 to adjust the adjustable module 70 to fine-tune the output voltage of the duplicated voltage digital-to-analog converter 54. FIG. 4B shows a schematic diagram of another embodiment of an adjustable module of the present invention. The adjustable module 70 is composed of a digital adjustable resistor $R_{78}$. It achieves the fine-tuning function by adjusting the reference voltage 72 of the duplicated voltage digital-to-analog converter 54.

Figure 5:
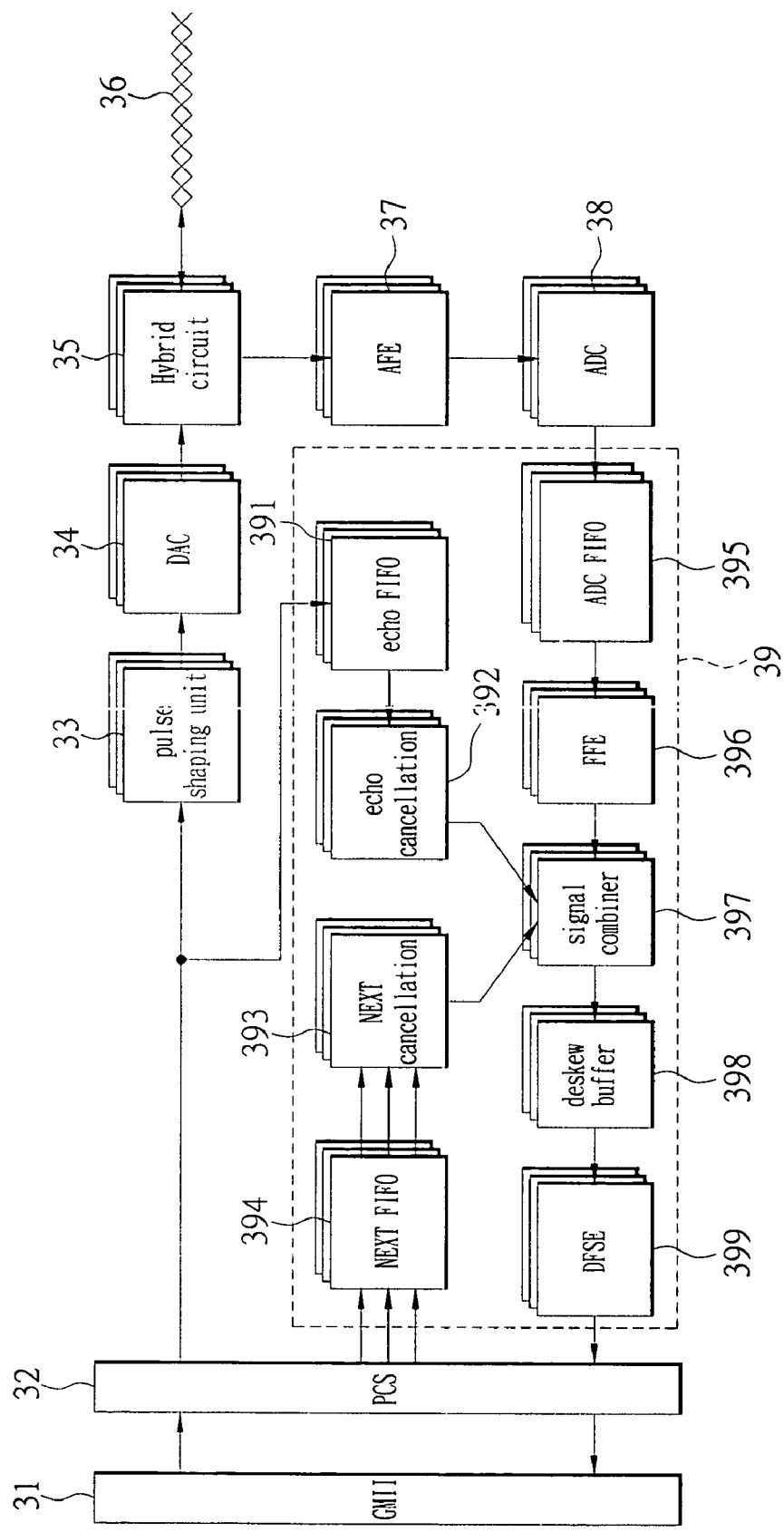
FIG. 5 is a schematic diagram of the active hybrid circuit for a full duplex channel of the present invention when applied to a 1000BASE-T.

Referring to FIG. 5, there is shown a schematic diagram of an active hybrid circuit for a full duplex channel of the present invention applied to a 1000BASE-T transceiver. The transmit data is transmitted to a physical coding system (PCS) 32 for encoding via a gigabit media independent interface (GMII) 31. A pulse shaping unit 33 is used for processing the pulse of the signal to increase the resolution of the transmit signal. Then, a digital-to analog converter (DAC) 34 converts the transmit signal into a current driving analog signal and the current driving analog signal is transmitted to another end of the channel via a twisted pair wire 36.

The receive signal is received from the twisted pair wire 36 and is amplified and anti-aliased by an analog front end (AFE) 37. Then, an analog-to-digital converter (ADC) 38 converts the receive signal into a digital signal. A DSP 39 is used for processing the digital signal, such as signal compensation, echo cancellation, near end cross-talk cancellation and estimation.

The DSP 39 comprises an echo first input first output (echo FIFO) 391, an echo cancellation 392, a near end cross-talk cancellation 393, a near end cross-talk first input first output (NEXT FIFO) 394, a ADC FIFO 395, a feed forward equalizer (FFE) 396, a signal combiner 397, a deskew buffer 398 and a decision feedback sequence estimation (DFSE) 399. The echo FIFO 391 connects to the transmitter. The echo cancellation 392 connects to the echo FIFO 391 for canceling the energy of the transmit signal echoing in the receiver. The NEXT FIFO 394 connects to the PCS 32 and the NEXT cancellation 393 connects to the NEXT FIFO 394 for canceling the disturbance signal that comes from another neighbor full duplex channel. The ADC FIFO 395 connects to the ADC 38 and the FFE 396 connects to the ADC FIFO 395 for compensating the receive signal, such as phase compensation and frequency compensation. The signal combiner 397 connects to the echo cancellation 392, the NEXT cancellation 393 and the FFE 396 for producing a receive signal without disturbance signal. The deskew buffer 398 connects to the signal combiner 397 and the DFSE connects to the deskew buffer 398.

In high-speed full duplex channel systems, the energy of the transmitter echoes into to the receiver and the duplicated voltage at the current output stage of the present invention can cancel the echo energy, improve the error rate of the receive signal and increase the transmission range. As such, the high-speed full duplex channel system further comprises a hybrid circuit 35, such as the duplicated voltage digital-to-analog converter 54. The hybrid circuit 35 generates a duplicated voltage according to the analog transmit signal of the transmit digital-to-analog converter for canceling the echo energy.

Figure 6:
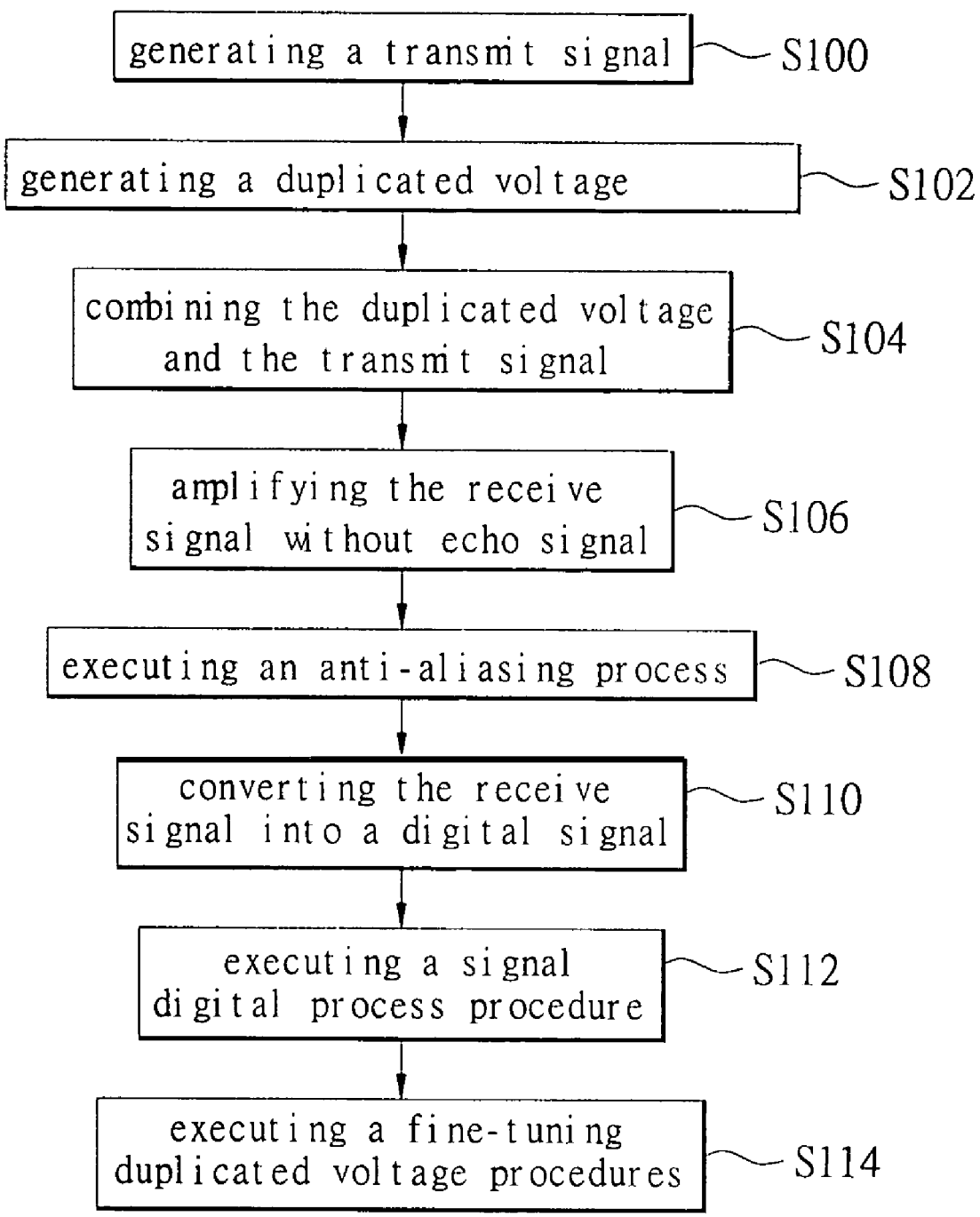
FIG. 6 is a flow chart that is a method for processing signals of an active hybrid circuit for a full duplex channel of the present invention.

The present invention also provides a method for processing signals of an active hybrid circuit for a full duplex channel. The active hybrid circuit for a full duplex channel has a transmitter with a current driving mode, a receiver and a transmit line. FIG. 6 shows a flow chart of a method for processing signals of an active hybrid circuit for a full duplex channel of the present invention. The method comprises generating a transmit signal by a current output driver of the transmitter (step 100), then generating a duplicated voltage according to the corresponding output drive current of the transmit signal through the load resistor of the transmission line (step 102), and, combining the duplicated voltage and the transmit signal to cancel the echo signal of the receiver that comes from the transmit signal of the transmitter (step 104). The present invention uses a gain amplifier to amplify the receive signal without echo signals to increase the resolution (step 106) and executes an anti-aliasing process to cancel the alias symptom by using an anti-aliasing filter (step 108). Finally, it converts the receive signal into a digital signal by an analog-to-digital converter (step 110) and executes a digital signal process procedure by a DSP (step 112).

The method for processing signals of an active hybrid circuit for a full duplex channel of the present invention further comprises a fine-tuning duplicated voltage procedure (step 114). This step cancels the overshoot of the signal that is caused by variations of the components. The procedure can be executed by the DSP.

The present invention has the following characteristics:

1. The present active hybrid circuit for a full duplex channel generates a duplicated voltage to cancel the energy of the transmitter that is transmitted to the receiver. This circuit improves the error rate of the receive signal and increase the transmission range. The frame of this circuit is simple and the cost of the circuit is low.

2. The present active hybrid circuit for a full duplex channel generates a duplicated voltage and can be operated in a low voltage environment and is also suitable for a full duplex channel with high-speed transmission.

3. The present active hybrid circuit for a full duplex channel has an adjustable module. The adjustable module overcomes the variations of components of the circuit by adjusting the duplicated voltage and canceling the high frequency overshoot that is caused by the components.

The description above only illustrates specific embodiments and examples of the invention. The invention should therefore cover various modifications and variations made to the structure described herein and the operations of the invention, provided they fall within the scope of the invention as defined in the following appended claims.

What is claimed is:

1. An active hybrid circuit for a full duplex channel, comprising:
    a transmit digital-to-analog converter having a positive output port and a negative output port for generating an analog transmit signal;
    a receive analog-to-digital converter having a positive input port and a negative input port for receiving an analog receive signal;
    a duplicated voltage digital-to-analog converter having a positive output port and a negative output port for generating a duplicated voltage, the duplicated voltage including a duplicate of the analog transmit signal of the transmit digital-to-analog converter;
    a plurality of signal combiners each electrically connected at a first input thereof to the positive output port and negative output port of the transmit digital-to-analog converter and at an output thereof to the positive input port and the negative input port of the receive analog-to-digital converter, the plurality of signal combiners each connected at a second input thereof to the positive output port and the negative output port of the duplicated voltage digital-to-analog converter, the plurality of signal combiners each subtracting the duplicated voltage from the analog transmit signal; and
    a digital signal processor coupled to the receive analog-to-digital converter and responsive to a digital signal therefrom to provide a digital control signal, wherein the duplicated voltage produced by the duplicated voltage digital-to-analog converter is adjusted in accordance with the digital control signal.

2. The active hybrid circuit for a full duplex channel of claim 1, further comprising:
    a gain amplifier electrically connected to the plurality of signal combiners for amplifying the receive signal; and
    an anti-aliasing filter electrically to interposed between the gain amplifier and the receive analog-to-digital converter for canceling the alias signal of the receive signal.

3. The active hybrid circuit for a full duplex channel of claim 1, further comprising an adjustable module electrically interposed between the digital signal processor and the duplicated voltage digital-to-analog converter, the adjustable module receiving the digital control signal and producing an adjustment signal responsive thereto, the adjustment signal being provided to the duplicated voltage digital-to-analog converter for producing responsive thereto the adjusted duplicated voltage.

4. The active hybrid circuit for a full duplex channel of claim 3, wherein the adjustable module includes a digital adjustable resistor receiving the digital control signal and responsive thereto adjusting a reference voltage of the duplicated voltage digital-to-analog converter.

5. The active hybrid circuit for a full duplex channel of claim 3, wherein the adjustable module includes a digital adjustable resistor in a gain control circuit of an operational amplifier, the digital adjustable resistor receiving the digital control signal and responsive thereto adjusting the output voltage of the operational amplifier.

6. The active hybrid circuit for a full duplex channel of claim 1, wherein the transmit digital-to-analog converter includes a current output drive stage.

7. The active hybrid circuit for a full duplex channel of claim 1, wherein the duplicated voltage digital-to-analog converter includes a current scale network, an operational amplifier and a resistor.

8. A method for processing signals in an active hybrid circuit for a full duplex channel, the active hybrid circuit for a full duplex channel including a transmitter in a current driving mode, a receiver and a transmit line, the method comprising:

generating a transmit signal with a current output driver in the transmitter;

generating a duplicated voltage corresponding to an output drive current of the current output driver in a load resistor of in the transmission line;

combining the duplicated voltage and a receive signal at the receiver to cancel an echo signal coupled to the receiver from the transmit signal;

converting the receive signal into a digital signal; and adjusting the duplicated voltage in accordance with the digital signal.

9. The method for processing signals of an active hybrid circuit for a full duplex channel of claim 8, further including the step of anti-aliasing the echo-cancelled receive signal.

10. The method for processing signals of an active hybrid circuit for a full duplex channel of claim 8, further comprising the step of calculating a fine-tuning voltage from the digital signal so as to cancel a voltage overshoot in the receive signal caused by responses of components.

11. The method for processing signals of an active hybrid circuit for a full duplex channel of claim 10, wherein the fine-tuning voltage calculating step is performed by a digital signal processor.

12. The method for processing signals of an active hybrid circuit for a full duplex channel of claim 8 further including the step of amplifying the receive signal prior to the receive signal converting step.

* * * * *